United States Patent
Bourgault et al.

(10) Patent No.: US 7,870,826 B2
(45) Date of Patent: Jan. 18, 2011

(54) METHOD AND DEVICE FOR ADJUSTING AND CONTROLLING PACKING FORCE

(75) Inventors: Gerard F. Bourgault, St. Brieux (CA); Mark Cresswell, Tisdale (CA)

(73) Assignee: Bourgault Industries Ltd. (CA)

( * ) Notice: Subject to any disclaimer, the term of this patent is extended or adjusted under 35 U.S.C. 154(b) by 0 days.

(21) Appl. No.: 12/173,267

(22) Filed: Jul. 15, 2008

(65) Prior Publication Data
US 2009/0020053 A1 Jan. 22, 2009

(30) Foreign Application Priority Data
Jul. 18, 2007 (CA) .................... 2594032

(51) Int. Cl.
*A01C 5/00* (2006.01)
*A01C 7/18* (2006.01)
*A01C 13/00* (2006.01)
*A01C 15/00* (2006.01)

(52) U.S. Cl. ................... 111/69; 111/195; 111/200

(58) Field of Classification Search ............ 111/69, 111/52, 59, 62, 190–195, 200
See application file for complete search history.

(56) References Cited

U.S. PATENT DOCUMENTS

| | | | | |
|---|---|---|---|---|
| 5,331,907 A | * | 7/1994 | Beaujot | 111/52 |
| 5,396,851 A | * | 3/1995 | Beaujot | 111/187 |
| 5,479,992 A | * | 1/1996 | Bassett | 172/4 |
| 5,709,271 A | * | 1/1998 | Bassett | 172/4 |
| 6,142,085 A | * | 11/2000 | Drever et al. | 111/151 |
| 7,159,523 B2 | | 1/2007 | Bourgault et al. | |
| 7,578,246 B2 | * | 8/2009 | Ryder et al. | 111/136 |
| 2004/0211346 A1 | * | 10/2004 | Beaujot et al. | 111/170 |
| 2004/0217575 A1 | * | 11/2004 | Beaujot et al. | 280/442 |

* cited by examiner

*Primary Examiner*—Christopher J. Novosad
(74) *Attorney, Agent, or Firm*—Thompson Hine LLP

(57) ABSTRACT

A seeding apparatus having a furrow opener attached to a first trailing arm, sensor for sensing the amount of ground force to which the furrow opener is being subjected, a second trailing arm, a packing wheel in secure engagement with the second trailing arm and adapted to pack a seeded furrow, an actuator and a control device in communication with the actuator and in communication with the sensor for applying a variable bias force to the packing wheel.

12 Claims, 2 Drawing Sheets

METHOD AND DEVICE FOR ADJUSTING AND CONTROLLING PACKING FORCE

PRIORITY

This application claims priority to Canadian Patent Application Serial No. 2,594,032 filed on Jul. 18, 2007, the entire contents of which are hereby incorporated by reference.

FIELD OF THE INVENTION

The present invention relates to agricultural implements and more specifically relates to seeding, fertilizing, and chemical application devices and methods for using same.

BACKGROUND

Devices for seeding, fertilizing and for applying chemicals such as herbicides, fungicides and pesticides in an agricultural field (which device or devices are hereinafter collectively referred to as a "seeder" or "seeders") may include seeders such as the apparatus described in U.S. Pat. No. 7,159,523 B2 to Bourgault and Cresswell, which provides a frame which may be drawn by a tractor unit by way of a draw hitch, a trailing arm pivotally connected at the front end thereof to the frame, and a packer wheel rotatably attached to the rear end thereof, a furrow opener for creating a furrow attached to the trailing arm ahead of a seed boot (the seed boot being attached to a source of seed or chemical, through which seed boot the seed or other chemical may pass for insertion into the furrow created by the furrow opener), the packer wheel rolling along behind the furrow opener and seed boot, firmly packing the seeded furrow.

To ensure effective and consistent germination of the seeds planted in the furrows, and to securely position within the furrow any chemical product which has been applied during the seeding process, it is desirable to provide adequate, but not excessive, and adjustable downward force on the packing wheel. Furthermore, to ensure that the seeds and/or chemical products are inserted into the ground at a desirable and consistent depth in the ground, it is desirable to maintain the furrow opener at a constant and predetermined depth.

SUMMARY

Accordingly, one object of the present invention is to provide adequate, but not excessive, and adjustable downward force on the packing wheel of a seeder.

Accordingly, another object of the present invention is to provide a seeder in which the furrow opener may be maintained at a constant and predetermined depth.

According to one aspect of the present invention, there is provided a seeding apparatus adapted for being drawn across the ground of an agricultural field by a tractor, comprising, at least one frame adapted for engagement with the tractor, at least one seeding unit comprising, a first trailing arm having a proximal end and a distal end, means for securely engaging the proximal end of the first trailing arm with the frame, a furrow opener, means for securely engaging the furrow opener with the first trailing arm proximate the distal end of the first trailing arm, means for sensing the amount of ground force to which the furrow opener is being subjected, means for placing seed in the opened furrow, a second trailing arm having a proximal end and a distal end, means for securely and pivotally engaging the proximal end of the second trailing arm with the frame, a packing wheel in secure engagement with the second trailing arm proximate the distal end of the second trailing arm and adapted to pack the seeded furrow, means for variably biasing the packing wheel toward the ground in communication with the means for sensing the amount of ground force to which the furrow opener is being subjected, and means for engaging the at least one seeding unit with the at least one frame, wherein information relating to the amount of ground force to which the furrow opener is being subjected is supplied by the sensor to the means for variably biasing the packing wheel toward the ground to control the amount of bias applied to the packing wheel.

According to another aspect of the present invention, there is provided a seeding apparatus adapted for being drawn across the ground of an agricultural field by a tractor, comprising, at least one frame adapted for engagement with the tractor, at least one seeding unit comprising, a first trailing arm having a proximal end and a distal end, means for pivotally engaging the proximal end of the first trailing arm with the frame, a furrow opener, means for securely engaging the furrow opener with the first trailing arm proximate the distal end of the first trailing arm, means for biasing the furrow opener into the ground, means for sensing the amount of ground force to which the furrow opener is being subjected, means for placing seed in the opened furrow, a second trailing arm having a proximal end and a distal end, means for securely engaging the proximal end of the second trailing arm with the first trailing arm, a packing wheel in secure engagement with the second trailing arm proximate the distal end of the second trailing arm and adapted to pack the seeded furrow, means for variably biasing the packing wheel toward the ground in communication with the means for sensing the amount of ground force to which the furrow opener is being subjected, and means for engaging the at least one seeding unit with the at least one frame, wherein information relating to the amount of ground force to which the furrow opener is being subjected is supplied by the sensor to the means for variably biasing the trailing arms toward the ground to control the amount of bias applied to the packing wheel.

One advantage of the present invention is that it provides adequate, but not excessive, and adjustable downward force on the packing wheel of a seeder.

A further advantage of the present invention is that it provides a seeder in which the furrow opener may be maintained at a constant and predetermined depth.

BRIEF DESCRIPTION OF THE DRAWINGS

One embodiment of the present invention is described below with reference to the accompanying drawings, in which.

DETAILED DESCRIPTION

Figure 1:
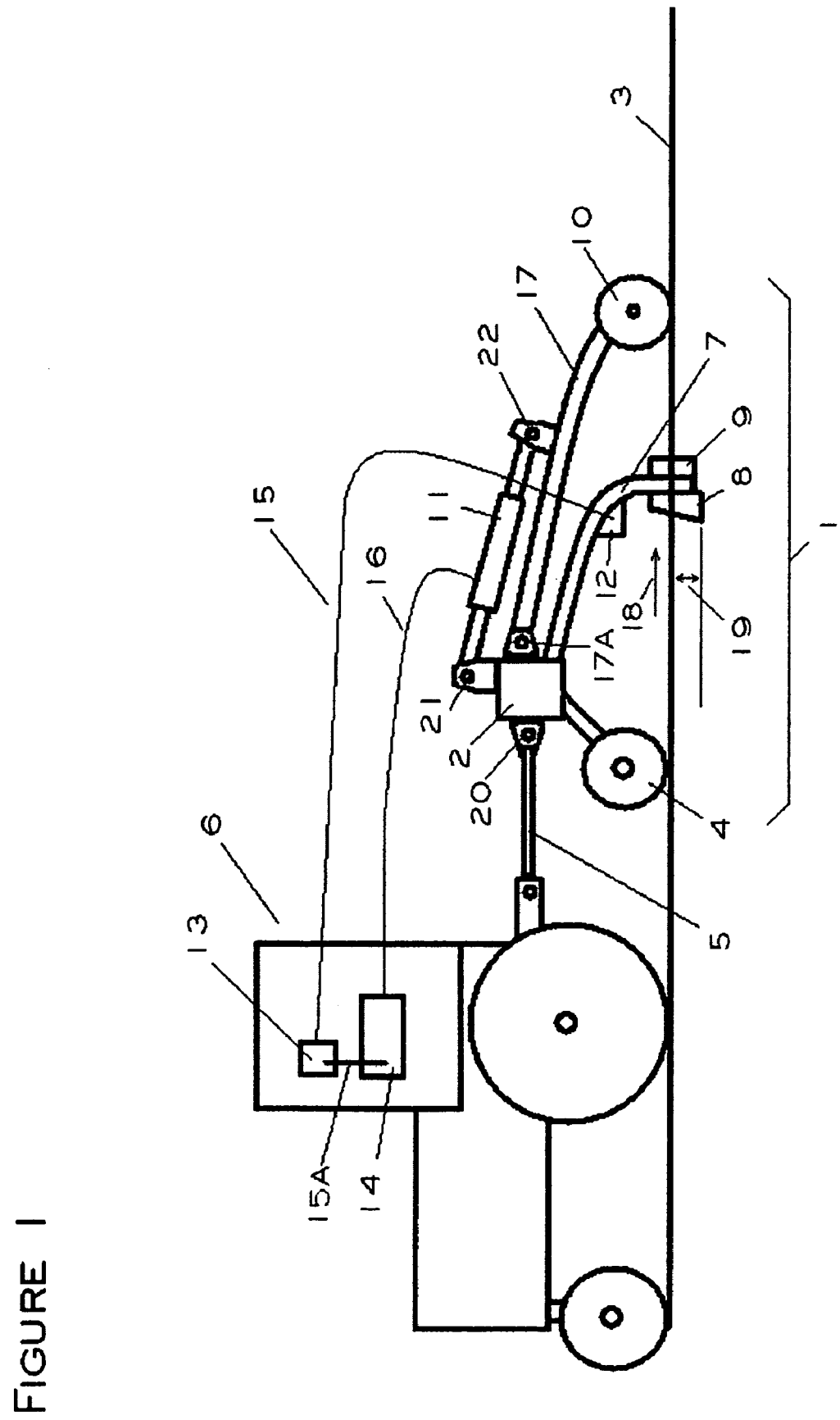
FIG. 1 is a schematic side view of an embodiment of the present invention.

In a first embodiment of the present invention, with reference to FIG. 1, a tractor 6, by means of a draw hitch 5, pulls the seeder 1 across the ground 3 of the agricultural field, the seeder 1 having a frame 2 which may be pivotally connected (at 20) to the draw hitch 5 (it being understood that in an alternative embodiment of the present invention, a non-pivotable connection may be provided between the frame 2 and the draw hitch 5), which frame 2 is supported by one or more wheels 4 which roll along the ground 3 in front of multiple sets of independent seeding units as more fully described herein.

As more fully described herein, in this first embodiment of the present invention, each independent seeding unit is operatively attached to the frame 2 (it being understood that in an alternative embodiment of the present invention, each independent seeding unit is operatively attached to a trippable release device (not shown) which is attached to the frame, the trippable release device being adapted to allow the independent seeding unit to pivot relative to the frame in the event that the independent seeding unit comes into contact with a large rock or other obstacle) and has a furrow opener 8, seed boot 9 and packer wheel 10. The height of the seeder frame 2 is adjustable relative to the seeder's wheels 4, in a manner known to a person skilled in the art, to vary the depth of the furrow opener 8 in the ground (and as a result, to vary the depth 19 of the furrow being cut by the furrow opener 8).

In this embodiment of the present invention, the furrow opener 8 and seed boot 9 in each independent seeding unit is securely attached to the frame 2 (or alternatively, as described above, a trippable release device) by a non-pivoting first trailing arm 7 so that as the frame height is lowered relative to the ground (by lowering the height of the frame 2 relative to the wheels 4), the furrow opener 8 is positioned deeper into the ground and cuts a deeper furrow, whereas when the frame height is raised relative to the ground (by raising the height of the frame 2 relative to the wheels 4), the furrow opener 8 accordingly cuts a shallower furrow. In this embodiment, the packer wheel 10 for each independent seeding unit is attached to a pivotable (at 17A) second trailing arm 17, a downward force being applied to the pivotable second trailing arm 17 and to the packer wheel 10 by means of a hydraulic cylinder 11 pivotably connected at one end thereof (at 21) to the frame 2 and at the other end thereof (at 22) to the second trailing arm 17, the hydraulic fluid of which hydraulic cylinder 11 is, by means of an adjustable hydraulic fluid pump 14 and programmable control device 13 in communication therewith (15A), generally maintained at a constant pressure (unless varied, as more fully described herein), to generally provide a constant downwardly directed biasing force on the second trailing arm 17 and packer wheel 10 (unless varied, as more fully described herein).

In one variation of this first embodiment of the present invention, a ground force sensor 12 such as a strain gauge (or such other device as would be known to person skilled in the art which is adapted to detect and measure changes in the forces being applied to the first trailing arm 7), is operatively attached to the first trailing arm 7, the sensor 12 producing a signal corresponding or relating to the ground force 18 currently being exerted on the furrow opener 8, the signal being electronically, pneumatically, hydraulically or otherwise communicated by a wire 15 (or as appropriate, hydraulic or other line) to the programmable control device 13 and adjustable hydraulic fluid pump 14, which programmable control device 13 and adjustable hydraulic fluid pump 14, may, for example, upon receipt of a signal from the sensor 12 consequently, by means of the hydraulic line 16, alter the hydraulic fluid pressure in the hydraulic cylinder 11. In operation, for example, as relatively more densely packed ground (such as dry clay) is being seeded, relatively more ground force is exerted on the furrow opener 9 and first trailing arm 7 and upon the sensor 12 detecting a relatively increased ground force on the first trailing arm 7 the programmable control device 13 and adjustable hydraulic fluid pump 14, may, in response thereto, increase the hydraulic fluid pressure in the hydraulic cylinder 11, to thereby increase the packing force on the second trailing arm 17 and the packing wheel 10. Similarly, as relatively less densely packed ground (such as wet sandy loam soil) is being seeded, relatively less ground force is exerted on the furrow opener 9, and the programmable control device 13 and adjustable hydraulic fluid pump 14, upon the sensor 12 detecting a relatively decreased ground force may in response thereto, decrease the hydraulic fluid pressure in the hydraulic cylinder 11, to thereby decrease the packing force on the second trailing arm 17 and the packing wheel 10.

The variation of the first embodiment as described in the foregoing, provides for increased packing force in response to increased soil forces. Other desirable responses to changes in ground force are anticipated. In certain soil conditions it will be desirable for packing force to be reduced as ground force increases, and increased as ground force decreases. This would be the case in field conditions such as wet clay soil where it is desirable to avoid over-packing and in dry sandy soil, where although ground forces are low, firmly packed soil is desired to enhance capillary action of the soil and bring seed into contact with moist soil. In the seeder of the present invention, a wide range of such alternate control schemes may be programmed into the programmable controller to vary the packing force as is desired in response to changes in ground force.

In a further variation of the first embodiment of the present invention, multiple packer wheels may be securely mounted directly (or by way of a sub-frame (not shown) in a manner known to a person skilled in the art), proximate the distal end of a single second trailing arm 17 to form a gang of packer wheels, which packer wheels are positioned so that each seeded furrow is packed by a single packer wheel, a hydraulic cylinder acting on the single second trailing arm providing downwardly directed biasing force on the single second trailing arm 17 and each of the packer wheels attached directly (or indirectly, by way of a sub-frame) thereto. Control for the biasing force being applied to the single second trailing arm 17 is by way of a ground force sensor 12 such as a strain gauge (or such other device as would be known to person skilled in the art which is adapted to detect and measure changes in the forces being applied to the first trailing arm 7), operatively attached to a first trailing arm 7, the sensor 12 producing a signal corresponding or relating to the ground force 18 currently being exerted on the furrow opener 8, the signal being electronically, pneumatically, hydraulically or otherwise communicated by a wire 15 (or as appropriate, hydraulic or other line) to the programmable control device 13 and adjustable hydraulic fluid pump 14, which programmable control device 13 and adjustable hydraulic fluid pump 14, may, for example, upon receipt of a signal from the sensor 12 consequently, by means of the hydraulic line 16, alter the hydraulic fluid pressure in the hydraulic cylinder 11.

Figure 2:
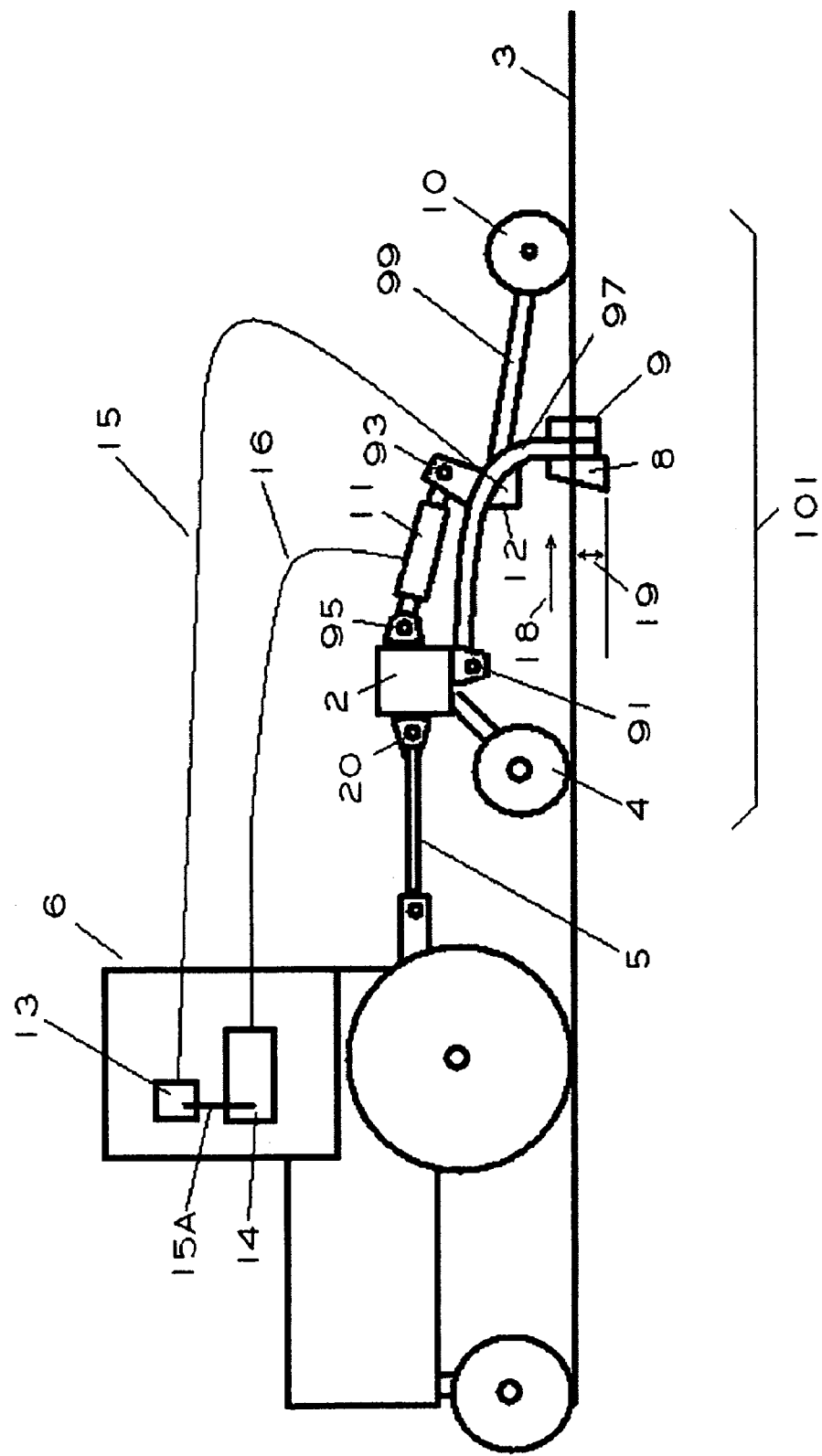
FIG. 2 is a schematic side view of an alternative embodiment of the present invention.

In a second embodiment of the present invention, with reference to FIG. 2, a tractor 6, by means of a draw hitch 5, pulls the seeder 101 across the ground 3 of the agricultural field, the seeder having a frame which may be pivotally connected (at 20) to the draw hitch 5 (it being understood that in an alternative embodiment of the present invention, a non-pivotable connection may be provided between the frame 2 and the draw hitch 5), which frame 2 is supported by one or more wheels 4 in front of multiple sets of independent seeding units as more fully described herein. In this embodiment of the present invention, each independent seeding unit is operatively attached to the frame 2 (it being understood that in an alternative embodiment of the present invention, each independent seeding unit is operatively attached to a trippable release device (not shown) which is attached to the frame, the trippable release device being adapted to allow the independent seeding unit to pivot relative to the frame in the event that the independent seeding unit comes into contact with a large rock or other obstacle) and has a furrow opener 8, seed boot 9 and packer wheel 10.

In this second embodiment of the present invention, in respect of each independent seeding unit, the furrow opener 8 and seed boot 9 is attached to the frame 2 by a pivoting first trailing arm 97, a constant downward biasing force being applied (unless varied, as more fully described herein) to the first trailing arm 97 and non-pivoting second trailing arm 99 (and to the packer wheel 10 attached thereto) by means of a hydraulic cylinder 11 pivotally connected on one end (at 95) to the frame and on the other end (at 93), to the first trailing arm 97, the hydraulic fluid of which hydraulic cylinder 11 is, by means of the adjustable hydraulic fluid pump 14 and programmable control device 13 in communication therewith (15A), maintained at a constant pressure (unless varied as more fully described herein) to provide a constant downwardly directed biasing force (unless varied as more fully described herein) on the first trailing arm 97, the non-pivoting second trailing arm 99 and the packer wheel 10.

In this embodiment of the present invention, the height of the packer wheel 10 relative to the height of the furrow opener 9 determines the depth of the furrow opener 9 in the ground (the position of the packer wheel may be adjusted upwardly relative to the furrow opener to provide a deeper furrow and downwardly relative to the furrow opener to provide a shallower furrow). The effect of the downwardly directed biasing force is to keep the furrow opener in the ground at all times and to keep the packer wheel 10 in rolling engagement with the ground. As the force applied by the hydraulic cylinder 11 is partially offset by the upward ground force and rearward ground force 18 on the furrow opener 8, and partially offset by the force required to keep the packer wheel 10 positioned in rolling engagement on the ground, and as the ground force varies with varying types of ground types and conditions in the field, in order to maintain the packer wheel 10 in constant contact with the ground 3 and exerting a desirable amount of downward packing force on the seeded furrow, it is therefore advantageous to provide the ability to vary the downwardly directed biasing force supplied by the hydraulic cylinder 11 to maintain the desired amount of downward packing force of the packing wheel on the seeded furrow. To provide this capability, this embodiment also provides a ground force sensor 12 such as a strain gauge (or such other device as would be known to person skilled in the art which is adapted to detect and measure changes in the forces being applied to the first trailing arm 97), operatively attached to the first trailing arm 97, the sensor 12 producing a signal corresponding to the ground force currently being exerted on the furrow opener 8, the signal being electronically, pneumatically, hydraulically or otherwise communicated by a wire 15 (or as appropriate, hydraulic or other line) to the programmable control device 13 and adjustable hydraulic fluid pump 14, which programmable control device 13 and adjustable hydraulic fluid pump 14, may, for example, consequently alter the hydraulic fluid pressure in the hydraulic cylinder 11 to provide the desired packing force on the packing wheel. In this embodiment of the invention, the hydraulic cylinder 11 as controlled by the programmable control device 13 and adjustable hydraulic fluid pump 14 may provide a constant biasing force in the direction of extension and, may receive additional hydraulic pressure from the adjustable hydraulic fluid pump 14 to increase the downward force on the packing wheel 10, or may receive reduced hydraulic pressure from the adjustable hydraulic fluid pump 14 to decrease the downward force on the packing wheel 10, as necessary or desired.

The programmable control device 13 may be programmed so that regardless of the input from the sensor, hydraulic fluid is supplied to the hydraulic cylinder under constant pressure.

In this second embodiment, when the sensor is communicating to the programmable control device 13 no change of ground force on the first trailing arm (or alternatively, when the sensor is communicating that the change of ground force is within a predetermined range), the programmable control device 13 does not alter or adjust the pressure of the hydraulic fluid being supplied by the adjustable hydraulic fluid pump 14 to the hydraulic cylinder. When the sensor communicates that there is a reduction in ground force (or alternatively, when the sensor is communicating that the reduction in ground force is beyond a predetermined range), the programmable control device 13 reduces the pressure of the hydraulic fluid being supplied by the adjustable hydraulic fluid pump 14 to the hydraulic cylinder. When the sensor communicates that there is an increase in the ground force (or alternatively, when the sensor is communicating that the increase in ground force is beyond a predetermined range), the programmable control device 13 increases the pressure of the hydraulic fluid being supplied by the adjustable hydraulic fluid pump 14 to the hydraulic cylinder. In this way, packing force may be maintained constant as soil forces change.

Alternatively, the programmable control device 13 may be programmed and operative to increase packing force as ground forces increase and to decrease packing force as ground forces decrease, as may be desired to suit certain soil conditions.

To suit other soil conditions, the programmable control device 13 may programmed and operative to reduce packing force as ground forces increase and to increase packing force as ground forces decrease. Thus when the sensor is communicating no change of ground force on the first trailing arm (or alternatively, when the sensor is communicating that the change of ground force is within the predetermined range), the programmable control device 13 does not alter or adjust the pressure of the hydraulic fluid being supplied by the adjustable hydraulic fluid pump 14 to the hydraulic cylinder. When the sensor communicates that there is a reduction in ground force (or alternatively, when the sensor is communicating that the reduction in ground force is beyond a predetermined range), the programmable control device increases the pressure of the hydraulic fluid being supplied by the adjustable hydraulic fluid pump 14 to the hydraulic cylinder, and when the sensor communicates that there is an increase in the ground force (or alternatively, when the sensor is communicating that the increase in ground force is beyond a predetermined range), the programmable control device decreases the pressure of the hydraulic fluid being supplied by the adjustable hydraulic fluid pump 14 to the hydraulic cylinder.

In a third embodiment of the present invention, the programmable control device is also adapted to receive an input signal from the tractor operator who may provide an input signal to the programmable control device in a manner known to a person skilled in the art to override other or contrary input signals received by the programmable control device and to adjust or control in any desirable manner the adjusted level of the pressure of the hydraulic fluid being supplied by the adjustable hydraulic fluid pump 14 to the hydraulic cylinder, and thereby control the packing force accordingly.

While the present invention has been described above with reference to independent seeding units, it is understood that multiple independent seeding units are generally to be attached to one or more frames being drawn by a tractor. In this context, it is understood that each independent seeding unit may be fitted with its own sensor and independently hydraulically controlled, or alternatively, more than one independent seeding unit may be controlled by a single sensor operatively attached to one of the independent seeding units, the sensor information signal from which is used to control more than one of the independent seeding units. For example, where multiple frames are being utilized, one sensor on one of the independent seeding units on a frame may provide control information to an adjustable hydraulic fluid pump 14 to supply each of the multiple hydraulic cylinders on the multiple independent seeding units on that frame, and another sensor on one of the independent seeding units on another frame may provide control information to the adjustable hydraulic fluid pump 14 to supply each of the multiple hydraulic cylinders on the multiple independent seeding units on that other frame. Alternatively, one sensor on one of the independent seeding units may provide control information to an adjustable hydraulic fluid pump 14 to supply each of the multiple hydraulic cylinders on the multiple independent seeding units on all of the multiple frames.

Furthermore, while the present invention has been described with reference to the sensor being positioned on the first trailing arm, it is understood that alternative methods may be utilized to determine the ground force being applied to the furrow openers, which sensor information may be transmitted to the programmable control device and adjustable hydraulic fluid pump 14 in a known manner.

It is also understood that while the present invention has been described herein with reference to hydraulic components and a hydraulic system (the adjustable hydraulic fluid pump 14 hydraulically coupled with the hydraulic cylinder), in an analogous manner, and with applicable relevant modifications, pneumatic, electrical and mechanical components and systems known to a person skilled in the art may alternatively be substituted for the hydraulic components and hydraulic system.

The present invention has been described herein with regard to certain embodiments. However, it will be obvious to persons skilled in the art that a number of variations and modifications can be made without departing from the scope of the invention as described herein.

What is claimed is:

1. A control system for a seeding apparatus comprising:
   a first furrow opener for opening a first furrow;
   a first packer wheel;
   an actuator;
   a ground force sensor; and
   a control device;
   wherein the ground force sensor is operative to produce a ground force sensor signal in dependence upon a ground force acting on the first furrow opener, the ground force being dependent upon the soil condition of the ground, wherein the control device is operative to receive the ground force sensor signal and is operative to receive an input from an operator, and wherein the control device, in dependence upon one of at least the ground force sensor signal and the input from the operator, changes a bias force that the actuator applies to the first packer wheel such that a packing force exerted by the first packer wheel onto the ground is changed in dependence upon a change in the soil condition of the ground.

2. A control system for a seeding apparatus as defined in claim 1 wherein the first furrow opener is operatively mounted to a first trailing arm, the first packer wheel is operatively mounted to a second trailing arm and wherein the actuator is operatively connected to the second trailing arm.

3. A control system for a seeding apparatus as defined in claim 2 wherein the sensor comprises a strain gage operatively connected to the first trailing arm.

4. A control system for a seeding apparatus as defined in claim 1 wherein the first furrow opener is mounted to a first trailing arm and the first packer wheel is mounted to a second trailing arm, the second trailing arm being rigidly connected to the first trailing arm, and wherein the actuator is connected to at least one of the first and second trailing arms such that the bias force simultaneously acts on the first packer wheel and the first furrow opener.

5. A control system for a seeding apparatus as defined in claim 4 wherein the sensor comprises a strain gage operatively connected to the first trailing arm.

6. A control system as defined in claim 1 further comprising:
   a second furrow opener for opening a second furrow parallel to the first furrow; and
   a second packer wheel;
   wherein the second furrow opener and the second packer wheel are operatively connected in parallel alignment with the first furrow opener and the first packer wheel to form a gang of furrow openers and packer wheels, the actuator also being operatively connected to the second packer wheel to provide a bias force to both the first and second packer wheels.

7. A control system for a seeding apparatus comprising:
   a first furrow opener for opening a first furrow;
   a first packer wheel;
   an actuator adapted to apply a bias force;
   a ground force sensor; and
   a control device;
   wherein the ground force sensor is operative to produce a ground force sensor signal in dependence upon a ground force acting on the first furrow opener, the ground force being dependent upon the soil condition of the ground, and wherein the control device is operative to receive the ground force sensor signal, determine a control signal in dependence upon the ground force sensor signal, and send the control signal to the actuator to change the bias force to the packer wheel such that a packing force exerted by the first packer wheel onto the ground is changed in dependence upon a change in the soil condition of the ground.

8. A control system for a seeding apparatus as defined in claim 7 wherein the first furrow opener is mounted to a first trailing arm and the first packer wheel is mounted to a second trailing arm and wherein the actuator is operatively connected to the second trailing arm.

9. A control system for a seeding apparatus as defined in claim 8 wherein the sensor comprises a strain gage operatively connected to the first trailing arm.

10. A control system for a seeding apparatus as defined in claim 7 wherein the first furrow opener is mounted to a first trailing arm and the first packer wheel is mounted to a second trailing arm, the second trailing arm being rigidly connected to the first trailing arm, and wherein the actuator is connected to at least one of the first and second trailing arms such that the bias force simultaneously acts on the first packer wheel and the first furrow opener.

11. A control system for a seeding apparatus as defined in claim 10 wherein the sensor comprises a strain gage operatively connected to the first trailing arm.

12. A control system as defined in claim 7 further comprising:
   a second furrow opener for opening a second furrow parallel to the first furrow; and a second packer wheel;
wherein the second furrow opener and the second packer wheel are operatively connected in parallel alignment with the first furrow opener and the first packer wheel to form a gang of furrow openers and packer wheels, the actuator also being operatively connected to the second packer wheel to provide a bias force to both the first and second packer wheels.

* * * * *